United States Patent
Tseng et al.

(10) Patent No.: US 9,081,635 B2
(45) Date of Patent: Jul. 14, 2015

(54) PROVISION TO AN APPLICATION OF A RANDOM NUMBER NOT GENERATED BY AN OPERATING SYSTEM

(71) Applicant: LENOVO ENTERPRISE SOLUTIONS (SINGAPORE) PTE. LTD., Singapore (SG)

(72) Inventors: Gisele Wei-Tzu Tseng, Taipei (TW); Robert Chungwen Ma, Taipei (TW); Teresa Yun-Ting Hsu, Taipei (TW); Chester Ku Chang Kuo, Taipei (TW)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 0 days.

(21) Appl. No.: 14/017,928

(22) Filed: Sep. 4, 2013

(65) Prior Publication Data

US 2014/0177832 A1 Jun. 26, 2014

(30) Foreign Application Priority Data

Sep. 19, 2012 (TW) .............................. 101134236 A

(51) Int. Cl.
*H04L 9/00* (2006.01)
*H04L 9/32* (2006.01)
*G06F 7/58* (2006.01)

(52) U.S. Cl.
CPC ........................................ *G06F 7/58* (2013.01)

(58) Field of Classification Search
CPC ............... H04L 9/22; H04L 9/24; H04L 9/26; G06F 7/588; G06F 7/58; G06F 21/72; G06F 21/725

USPC .................. 380/46, 47; 713/189, 192–194; 726/26–27; 708/250, 255
See application file for complete search history.

(56) References Cited

U.S. PATENT DOCUMENTS

| | | | | |
|---|---|---|---|---|
| 5,454,039 A | * | 9/1995 | Coppersmith et al. | .......... 380/28 |
| 5,675,652 A | * | 10/1997 | Coppersmith et al. | .......... 380/28 |
| 6,871,206 B2 | * | 3/2005 | Henry et al. | .................. 708/250 |
| 6,886,023 B2 | | 4/2005 | Lundberg | |

(Continued)

FOREIGN PATENT DOCUMENTS

| CN | 100458685 C | 2/2009 |
|---|---|---|
| TW | 200841206 A | 10/2008 |
| TW | 201034423 A | 9/2010 |

OTHER PUBLICATIONS

Dulaunoy et al., "Hardware Random Number Generator Useful", AdulauWikiDiary, Jun. 23, 2008 http://www.foo.be/cgi-bin/wiki.pl/2008-06-23_Hardware_Random_Number_Generator_Useful.

(Continued)

*Primary Examiner* — Hosuk Song
(74) *Attorney, Agent, or Firm* — Edward J. Lenart; Katherine S. Brown; Kennedy Lenart Spraggins LLP

(57) ABSTRACT

A data processing system includes data storage that stores an operating system and an application that performs a security operation and a processor communicatively coupled with the data storage and a random number generator separate from the operating system. The processor executes the operating system and the application. The processor receives a random number from the random number generator and provides the received random number to the application for use in the security operation.

13 Claims, 2 Drawing Sheets

(56) References Cited

U.S. PATENT DOCUMENTS

| | | |
|---|---|---|
| 6,907,526 B2 * | 6/2005 | Tanimoto et al. ............. 713/174 |
| 8,782,801 B2 * | 7/2014 | Zhang et al. .................... 726/27 |
| 2009/0036188 A1 | 2/2009 | Gelman |
| 2010/0023749 A1 | 1/2010 | Kelly |
| 2010/0306296 A1 | 12/2010 | Inglett et al. |
| 2011/0047545 A1 | 2/2011 | Ellison et al. |

OTHER PUBLICATIONS

Seznec et al., "HAVEGE: A User-Level Software Heuristic for Generating Empirically Strong", ACM Transactions on Modeling and Computer Simulation, vol. 13, No. 4, Oct. 2003, pp. 334-346.

* cited by examiner

PROVISION TO AN APPLICATION OF A RANDOM NUMBER NOT GENERATED BY AN OPERATING SYSTEM

This application is based on and claims the benefit of priority from Taiwan Patent Application 101134236, filed on Sep. 19, 2012.

BACKGROUND OF THE INVENTION

The present invention relates to a computer system and a data processing method using a random number generator.

Security operations, such as a cryptographic procedure or identification procedure, in many user applications require the use of a random number. A conventional way of generating a random number involves the use of a random number generator (PRNG) in an operating system. Well known examples include the random number generator (LRNG) of the Linux® operating system. For more details, see Zvi Gutterman, Benny Pinkas, and Tzachy Reinman, 2006, *Analysis of the Linux Random Number Generator In Proceedings of the 2006 IEEE Symposium on Security and Privacy* (SP '06).

Other conventional ways of generating a random number by an operating system for the sake of an application are disclosed in US2010/00023749 or US2011/0047545, which are cited hereunder as appropriate.

SUMMARY OF THE INVENTION

In an aspect, the present invention provides a computer system and a data processing method using a random number generator. In particular, the present invention is intended to overcome a drawback of the prior art, that is, the inadequacy of the entropy of a software-based random number generator in an operating system. The drawback is notably found in plenty of embedded systems, because their operation is characterized by the lack of unanticipated extrinsic factors (such as user's data access) otherwise serving as an entropy source.

Also, program codes or operation architectures of operating systems in wide use, such as Linux® operating system, are open to the general public. As a result, the random number generating mechanism of the operating systems will not be kept confidential, if the operating systems use a software-based random number generator. Hackers have a high chance of inferring random numbers which can be generated from the random number generator of the operating systems, thereby posing a threat to security.

In another aspect, the present invention provides receiving a random number from a random number generator other than the random number generator of the operating system and providing the received random number to the user application to perform security operations.

According to the present invention an embodiment, the computer system comprises:
an operating system;
a processor running a user application in the operating system and connected with a first random number generator,
wherein, to meet the need of random numbers for security operations of the user application, the processor receives a random number from the first random number generator and provides the received random number to the user application to perform security operations,
wherein the first random number generator is not a random number generator of the operating system.

According to another embodiment of the present invention, the data processing method is for use with a computer system, wherein the computer system comprises an operating system and a processor, such that the processor is connected to a first random number generator. The method comprises the steps of:
receiving by the processor a random number from the first random number generator, wherein the first random number generator is not a random number generator of the operating system; and
providing by the processor the received random number to a user application to perform security operations.

According to another embodiment of the present invention, the data processing method is for use with a computer system, wherein the computer system comprises an operating system and a processor, such that the processor is connected to a first random number generator and a second random number generator. The method comprises the steps of:
receiving by the processor a random number from the first random number generator or the second random number generator selectively, wherein at least the first random number generator is not a random number generator of the operating system; and
receiving by the processor a random number from the first random number generator or the second random number generator selectively according to a value of a parameter.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but does not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
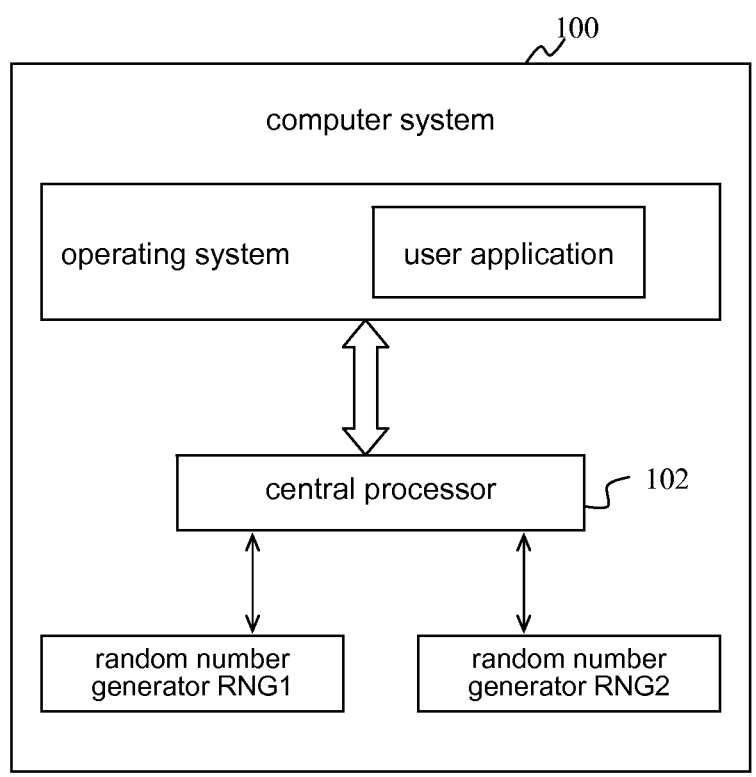
FIG. 1 shows a computer system according to an embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system, a method or a computer program product. Accordingly, the present invention may take the form of an entirely hardware embodiment, a software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
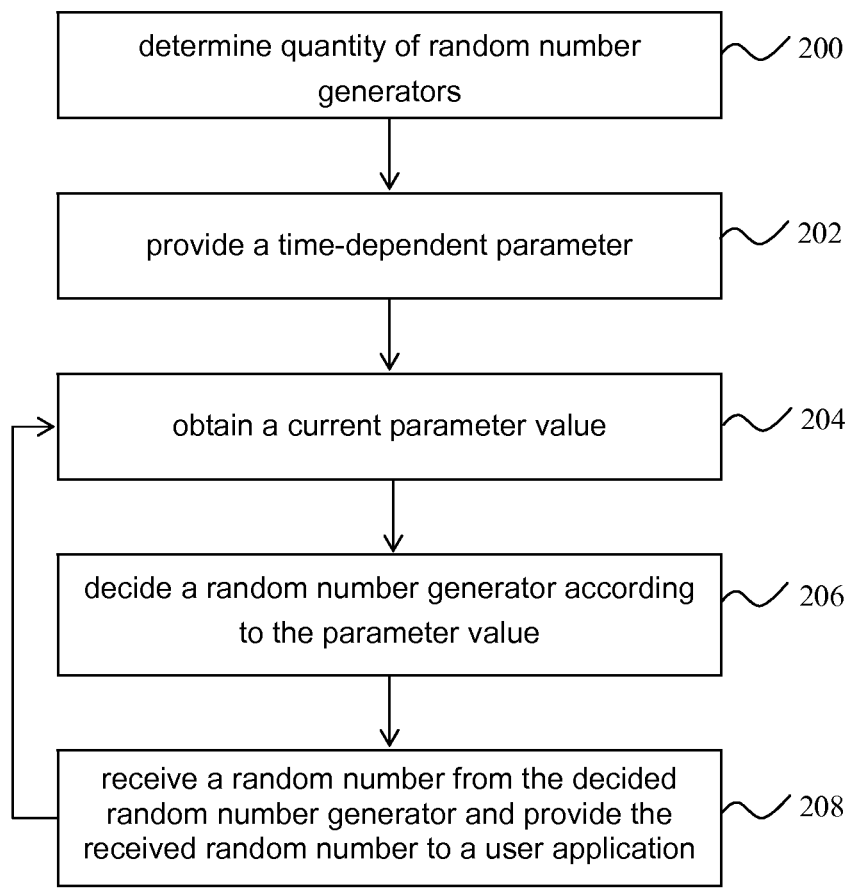
FIG. 2 is a flowchart of a method according to an embodiment of the present invention.

Referring now to FIG. 1 through FIG. 2, computer systems, methods, and computer program products are illustrated as structural or functional block diagrams or process flowcharts according to various embodiments of the present invention. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

System Framework

FIG. 1 shows the hardware architecture of a computer system 100 in an embodiment of the present invention. Other basic framework and components of the computer system 100 are disclosed in prior art related to personal computers or servers, such as IBM System X, Blade Center, or eServer servers. The computer system 100 can also be implemented in the form of an embedded system, such as a network device or an access point, and thus lacks a hard disk drive, a mouse, and a keyboard (not shown) which are indispensable to a typical personal computer.

The computer system 100 comprises a central processor 102 or any other equivalent processing circuit for executing an operating system OS. For the details of an example of the operating system OS, please make reference to Linux operating system. Related versions of Linux operating system can be installed on various said computer systems 100, such as an embedded system and a mainframe, respectively, and are well known among persons skilled in the art, and thus, are not reiterated herein for the sake of brevity; however, the present invention is not limited to Linux operating system.

Furthermore, the central processor 102 executes a user application AP in the operating system OS. The user application AP is built in the operating system OS. Alternatively, the user application AP is installed in the operating system OS by a user. Although the present invention is not restrictive of the functions provided by the user application AP, the user application AP utilizes a random number in security operations, such as a cryptographic procedure or identification procedure required for communication.

In particular, the central processor 102 is connected to a random number generator RNG1. The random number generator RNG1 is not a random number generator (such as LRNG) of the operating system OS. Preferably, the random number generator RNG1 is a hardware random number generator. In an exemplary embodiment, the hardware random number generator RNG1 is a hardware random number generator which is integrated with the central processor 102. That is to say, both the hardware random number generator RNG1 and the central processor 102 are implemented on the same chip. In another exemplary embodiment, the hardware random number generator RNG1 and the central processor 102 are implemented on different chips in the computer system 100. For example, the hardware random number generator RNG1 may implemented on a hardware password accelerator (such as an SSL Accelerator computer card), but is not necessarily mounted on the same motherboard (not shown) as the central processor 102. The hardware random number generator RNG1 can even be disposed outside the computer system 100 and connected to the central processor 102 via a network or by any other means of connection. (Visit the Wikipedia webpage http://en.wikipedia.org/wiki/Hardware_random_number_generator for more details of hardware random number generators.)

The random number generator RNG1 is not necessarily provided in the form of a hardware random number generator. In another exemplary embodiment, the random number generator RNG1 can be implemented by means of an additional computer system (not shown) other than the computer system 100, provided that the additional computer system is capable of providing a random number to the central processor 102 in the computer system 100. The present invention does not require that the additional computer system has to generate a random number through a hardware random number generator or by any other means. In yet another exemplary embodiment, data related to the random number generated or selected is provided to another virtual machine application (not shown) installed in the computer system 100, so as to be processed or used later.

In another aspect, preferably, the central processor 102 is further connected to a random number generator RNG2. The aforesaid way of implementing the random number generator RNG1 applies to the random number generator RNG2 exactly, except that the random number generator RNG2 can be a software-based random number generator (such as LRNG) in the operating system OS. In addition to the random number generator RNG1 and the random number generator RNG2, the central processor 102 can be connected to additional random number generators (not shown). The more random number generators to which the central processor 102 is connected, the higher is the degree of security of the user application AP.

The memory control method in an embodiment of the present invention is described below in conjunction with the hardware architecture shown in FIG. 1 and the flow chart of FIG. 2.

At step 200, which is intended for initialization, central processor 102 determines the quantity of random number generators connected thereto. In this embodiment, the central processor 102 is connected to the random number generator RNG1 and the random number generator RNG2, but the present invention is not limited thereto.

At step 202, the central processor 102 provides a time-dependent parameter for use in selecting between the random number generator RNG1 and the random number generator RNG2. In an embodiment, the parameter is jiffies of the central processor 102, wherein the variable jiffies increases by 1 in response to each instance of timer interrupt. For a further description of jiffies, see Chapter 2.7.: "Timing in the Linux Kernel" in Klaus Wehrle, Frank Pählke, Hartmut Ritter, Daniel Müller, Marc Bechler, *The Linux® Networking Architecture: Design and Implementation of Network Protocols in the Linux Kernel*. In this embodiment, the use of jiffies is advantageous because not only does the jiffies value vary with time continuously, but its changes are also unpredictable, thereby ensuring a high degree of security. However, the present invention is not limited to jiffies.

At step 204, the central processor 102 fetches the current jiffies value whenever it is necessary to provide a random number to the user application AP.

At step 206, central processor 102 selects one of the random number generator RNG1 and the random number generator RNG2 from which a random number is to be received, according to the parameter value fetched in step 204. For example, it is feasible to design a rule as follows: select the random number generator RNG1 when jiffies value is an odd number, and select the random number generator RNG2 when jiffies value is an even number, or vice versa.

If the random number generator RNG1 and the random number generator RNG2 differ in terms of the performance of random numbers, it will be feasible to give different weights to the random number generator RNG1 and the random number generator RNG2 according to jiffies value. For instance, the random number generator RNG1 can be selected when the jiffies value is a multiple of 3, and the random number generator RNG2 can be otherwise selected, such that the chance of selecting the random number generator RNG2 is twofold of the chance of selecting the random number generator RNG1. Hence, the use of jiffies value enables a user to further adjust the weights of the random number generators. The present invention is not limited to selecting between the random number generator RNG1 and the random number generator RNG2 according to jiffies value or any other methods related to a random number generator (not shown). If the central processor 102 in step 200 is only connected to the random number generator RNG1, then step 206 can be omitted.

At step 208, after receiving a random number from the random number generator RNG1 or the random number generator RNG2, the central processor 102 provides the received random number to the user application AP. Step 208 is followed by step 204.

Basically, random numbers generated by the random number generator RNG1 are different from bits required for the operation of a random number generator of the operating system OS and thus fetched from another hardware device (such as a keyboard or a hard disk drive). Hence, during the period from the point in time when the central processor 102 receives a random number from the random number generator RNG1 to the point in time before the central processor 102 provides the random number to the user application AP, it is no longer necessary for a random number generator (exemplified by the random number generator RNG2) of the operating system OS to perform extra random number software processing on a random number generated from the random number generator RNG1. Likewise, the processor need not perform software whitening, hashing, or encryption on the received random number again. For more information about the software processing and software whitening of random numbers, see Viega, J., *Practical Random Number Generation in Software*, Proceedings of the 19th Annual Computer Security Applications Conference, December 2003.

In another embodiment, if a random number provided by the random number generator RNG1 does not meet a specific security standard, such as FIPS-140 standard, the central processor 102 can process the random number provided by the random number generator RNG1 and then provide the standard-conforming random number to the user application AP.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A data processing system comprising a processor, a data storage that stores an operating system and an application that performs a security operation, and a first random number generator separate from the operating system; wherein the processor is configured to carry out the steps of:
   receiving a first random number from the first random number generator;
   receiving a second random number from a second random number generator, wherein the second random number generator is separate from the operating system; and
   executing the application to perform the security operation according to the first random number of the first random number generator and the second random number of the second random number generator.

2. The data processing system of claim 1, wherein the processor is further configured to carry out the steps of: selecting, based on a time-varying parameter, one of the first random number generator and the second random number generator to supply a third random number for use by the application.

3. The data processing system of claim 2, wherein the time-varying parameter is jiffies of the processor.

4. The data processing system of claim 2, wherein selecting, based on the time-varying parameter, one of the first random number generator and the second random number generator to supply the third random number for use by the application includes: utilizing different weights for each of the first random number generator and the second random number generator.

5. The data processing system of claim 1, wherein the first random number generator is a hardware random number generator.

6. The data processing system of claim 1, wherein the data processing system is an embedded system.

7. The data processing system of claim 1, wherein the processor is further configured to carry out the steps of providing the first random number to the application; wherein the processor refrains from performing software whitening on the first random number prior to providing the first random number to the application.

8. A method comprising:
   by first program instructions executed by a processor,
   receiving a first random number from a first random number generator;
   receiving a second random number from a second random number generator; and
   executing an application included in an operating system to perform a security operation according to the first random number of the first random number generator and the second random number of the second random number generator; wherein both the first random number generator and the second random number generator are separate from the operating system.

9. The method of claims 8 further comprising:
   selecting, based on a time-varying parameter, one of the first random number generator and the second random number generator to supply a third random number for use by the application.

10. The method of claim 9, wherein the time-varying parameter is jiffies of the processor.

11. The method of claim 9, wherein selecting, based on the time-varying parameter, one of the first random number generator and the second random number generator to supply the third random number for use by the application includes: utilizing different weights for each of the first random number generator and the second random number generator.

12. The method of claim 8, wherein:
   the first random number generator is a hardware random number generator.

13. The method of claim 8, further comprising:
   providing the first random number to the application; wherein the processor refrains from performing software whitening on the received random number prior to providing the first random number to the application.

* * * * *